(12) United States Patent
Levien et al.

(10) Patent No.: US 9,275,018 B2
(45) Date of Patent: Mar. 1, 2016

(54) TECHNIQUES FOR ANALYZING WEB PAGES TO DETERMINE FONT SUBSETS

(75) Inventors: Raphael Linus Levien, Berkeley, CA (US); David Kuettel, San Jose, CA (US); Brian Stell, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 424 days.

(21) Appl. No.: 13/558,699

(22) Filed: Jul. 26, 2012

(65) Prior Publication Data

US 2015/0161082 A1 Jun. 11, 2015

Related U.S. Application Data

(60) Provisional application No. 61/511,859, filed on Jul. 26, 2011.

(51) Int. Cl.
| | | |
|---|---|---|
| G06F 17/20 | (2006.01) | |
| G06F 17/21 | (2006.01) | |
| G06F 17/30 | (2006.01) | |
| G06F 17/22 | (2006.01) | |

(52) U.S. Cl.
CPC ............ *G06F 17/214* (2013.01); *G06F 17/227* (2013.01); *G06F 17/2217* (2013.01); *G06F 17/30011* (2013.01); *G06F 17/30876* (2013.01); *G06F 17/30905* (2013.01)

(58) Field of Classification Search
CPC . G06F 17/2247; G06F 17/211; G06F 17/227; G06F 17/214; G06F 17/30876; G06F 17/30011; G06F 17/30905; G06F 17/2217
See application file for complete search history.

(56) References Cited

U.S. PATENT DOCUMENTS

| | | | | |
|---|---|---|---|---|
| 5,528,742 A * | 6/1996 | Moore | ............... | G06F 17/214 715/205 |
| 6,023,714 A * | 2/2000 | Hill | ............... | G06F 17/211 715/235 |
| 6,065,008 A | 5/2000 | Simon et al. | | |
| 6,313,920 B1 | 11/2001 | Dresevic et al. | | |
| 7,064,757 B1 * | 6/2006 | Opstad | ............... | G06F 17/214 345/467 |
| 7,155,672 B1 * | 12/2006 | Adler | ............... | G06F 17/214 715/210 |
| 8,090,769 B2 | 1/2012 | Suzumura et al. | | |
| 8,201,088 B2 * | 6/2012 | Levantovsky | ............... | G06F 17/214 345/471 |
| 8,615,709 B2 * | 12/2013 | Lee | ............... | G06F 17/214 715/234 |
| 2005/0193336 A1 * | 9/2005 | Fux | ............... | G06F 17/214 715/269 |
| 2005/0275656 A1 | 12/2005 | Corbin et al. | | |

(Continued)

*Primary Examiner* — Stephen Hong
*Assistant Examiner* — Shahid Khan
(74) *Attorney, Agent, or Firm* — Remarck Law Group PLC

(57) ABSTRACT

A computer-implemented method technique can intercept, at a server including one or more processors, a first request for a source document representing a web page, the first request being transmitted from a computing device to a web server. The first request can include web browser information indicating web browser software executing on the computing device. The technique can intercept the source document being transmitted from the web server to the computing device in response to the first request. The source document can specify one or more fonts in which to display text in the source document. The technique can generate the web page, determine unique characters displayed at the web page, and obtain one or more font subsets. The technique can then transmit information to the computing device based on whether the web browser software is capable of displaying a font family having a plurality of fonts.

30 Claims, 4 Drawing Sheets

(56) References Cited

U.S. PATENT DOCUMENTS

| | | |
|---|---|---|
| 2006/0170684 A1 | 8/2006 | Kobayashi et al. |
| 2009/0307585 A1 | 12/2009 | Tranchant et al. |
| 2010/0194753 A1 | 8/2010 | Robotham et al. |
| 2010/0199174 A1 | 8/2010 | Leonov et al. |
| 2010/0199197 A1* | 8/2010 | Faletski ............ G06F 17/30905 715/760 |
| 2010/0218086 A1* | 8/2010 | Howell ................ G06F 17/214 715/236 |
| 2011/0043528 A1 | 2/2011 | Solomonov et al. |
| 2011/0093565 A1* | 4/2011 | Bacus ............... G06F 17/30905 709/219 |
| 2011/0115797 A1 | 5/2011 | Kaplan |
| 2011/0271180 A1 | 11/2011 | Lee |
| 2012/0066590 A1 | 3/2012 | Harris et al. |
| 2012/0079374 A1* | 3/2012 | Gaddis .............. G06F 17/30905 715/269 |
| 2013/0021361 A1 | 1/2013 | Liao |
| 2013/0120396 A1 | 5/2013 | Kaplan |
| 2013/0127872 A1 | 5/2013 | Kaplan |
| 2013/0326348 A1 | 12/2013 | Ip et al. |
| 2014/0019856 A1 | 1/2014 | Hernandez et al. |
| 2014/0240731 A1 | 8/2014 | Cogan |

\* cited by examiner

TECHNIQUES FOR ANALYZING WEB PAGES TO DETERMINE FONT SUBSETS

CROSS-REFERENCE TO RELATED APPLICATIONS

This application claims the benefit of U.S. Provisional Application No. 61/511,859, filed on Jul. 26, 2011. The entire disclosure of the above application is incorporated herein by reference.

FIELD

The present disclosure relates to web fonts and, more particularly, to techniques for analyzing web pages to determine font subsets.

BACKGROUND

The background description provided herein is for the purpose of generally presenting the context of the disclosure. Work of the presently named inventor, to the extent it is described in this background section, as well as aspects of the description that may not otherwise qualify as prior art at the time of filing, are neither expressly nor impliedly admitted as prior art against the present disclosure.

As a user browses a network, e.g., the Internet, at a computing device (client-side), the computing device can transmit a request via the network to a server (server-side). In response to the request, the server can provide a source document indicative of a web page to the computing device. The source document can specify text, formatting, hyperlinks, and the like. Web browser software executing on the computing device can display the web page using the source document. The source document can also specify a font in which to display the text. When the computing device has the specified font, e.g., in memory, the computing device can quickly display the web page. When the computing device does not have the specified font, the computing device can either locate and download the font via the network, e.g., from the server or another server, or the computing device can use another font in a font stack specified by the source document.

SUMMARY

A computer-implemented technique is presented. The technique can include intercepting, at a server including one or more processors, a request for a source document representing a web page, the request being transmitted from a computing device to a web server via a network. The request can include web browser information indicating web browser software executing on the computing device. The technique can include intercepting, at the server, the source document being transmitted from the web server to the computing device via the network in response to the request. The source document can specify one or more fonts in which to display text in the source document. The technique can include generating, at the server, the web page using the source document, the web page including the text displayed in the one or more fonts. The technique can include determining, at the server, unique characters displayed at the web page for each of the one or more fonts displayed at the web page. The technique can include obtaining, at the server, one or more font subsets based on the unique characters. The technique can include determining, at the server, whether the one or more fonts displayed at the web page form a font family having a plurality of fonts, each of the plurality of fonts having at least one of a different weight and a different style. The technique can include determining, at the server, whether the web browser software indicated by the web browser information is capable of displaying the font family having the plurality of fonts. The technique can include performing, at the server, one of a plurality of actions when the one or more fonts displayed at the web page form the font family having the plurality of fonts and the web browser software indicated by the web browser information is incapable of displaying the font family having the plurality of fonts. The plurality of actions can include modifying the source document to obtain a modified source document specifying the plurality of fonts for displaying text at the web page instead of the font family having the plurality of fonts. The plurality of actions can also include generating a command for the web browser software executing on the computing device and a single font subset including all of the unique characters of the font family displayed at the web page. The command can cause the web browser software to adjust one or more parameters for displaying the single font subset to automatically synthesize the plurality of fonts using the single font subset. The technique can also include transmitting, from the server to the computing device, information specifying the one or more font subsets when the web browser software indicated by the web browser information is capable of displaying the font family having the plurality of fonts, the modified source document, or the command and the single font subset.

Another computer-implemented technique is also presented. The technique can include intercepting, at a server including one or more processors, a first request for a source document representing a web page, the first request being transmitted from a computing device to a web server via a network. The first request can include web browser information indicating web browser software executing on the computing device. The technique can include intercepting, at the server, the source document being transmitted from the web server to the computing device via the network in response to the first request. The source document can specify one or more fonts in which to display text in the source document. The technique can include generating, at the server, the web page using the source document, the web page including the text displayed in the one or more fonts. The technique can include determining, at the server, unique characters displayed at the web page for each of the one or more fonts displayed at the web page. The technique can include obtaining, at the server, one or more font subsets based on the unique characters. The technique can also include transmitting, from the server, information to the computing device based on whether the web browser software indicated by the web browser information is capable of displaying a font family having a plurality of fonts. The information can include first information specifying the one or more font subsets. The information can also include second information to instruct the computing device how to obtain the one or more fonts displayed at the web page.

In some embodiments, the technique can further include determining whether the one or more fonts specified by the source document form a font family having a plurality of fonts, each of the plurality of fonts having at least one of a different weight and a different style.

In other embodiments, the technique can further include determining the second information when the one or more fonts specified by the source document form the font family having the plurality of fonts.

In some embodiments, determining the second information can include modifying the source document to obtain a modified source document specifying the plurality of fonts for displaying text at the web page instead of the font family having the plurality of fonts.

In other embodiments, modifying the source document to obtain the modified source document can include rewriting cascading style sheets (CSS) of the source document.

In some embodiments, determining the second information can include generating a command for the web browser software executing on the computing device.

In other embodiments, the command can cause the web browser software to adjust one or more parameters for displaying a single font subset to automatically synthesize the plurality of fonts using the single font subset.

In some embodiments, the technique can further include determining the single font subset including all of the unique characters of the font family displayed at the web page and transmitting information indicating the single font subset to the computing device to be used in the synthesis of the plurality of fonts.

In other embodiments, the server can be configured as a proxy server between the computing device and the web server.

In some embodiments, the source document can be retrieved in whole or in part from a datastore in response to the first request.

In other embodiments, the source document can be generated in whole or in part in response to the first request.

In some embodiments, the technique can further include receiving, at the server, a second request from the computing device, the second request being for one or more missing font subsets from the one or more font subsets specified by the first information. The one or more missing font subsets can be font subsets that the computing device does not have.

In other embodiments, the technique can further include embedding, at the server, the one or more missing font subsets or one or more locations of the one or more missing font subsets in the source document to obtain a modified source document, and transmitting, from the server, the modified source document to the computing device.

In some embodiments, the technique can further include transmitting, from the server, one or more locations from which to obtain the one or more missing font subsets to the computing device, wherein receiving the one or more locations causes the computing device to retrieve the one or more missing font subsets.

In other embodiments, the technique can further include generating, at the server, the one or more missing font subsets, and transmitting, from the server, the one or more missing font subsets to the computing device.

A server is also presented. The server can include a communication device and one or more processors. The communication device can be configured to intercept a first request for a source document representing a web page, the first request being transmitted from a computing device to a web server via a network. The first request can include web browser information indicating web browser software executing on the computing device. The communication device can also be configured to intercept the source document being transmitted from the web server to the computing device via the network in response to the first request. The source document can specify one or more fonts in which to display text in the source document. The one or more processors can be configured to generate the web page using the source document, the web page including the text displayed in the one or more fonts. The one or more processors can also be configured to determine unique characters displayed at the web page for each of the one or more fonts displayed at the web page. The one or more processors can be further configured to obtain one or more font subsets based on the unique characters. The communication device can be further configured to transmit information to the computing device based on whether the web browser software indicated by the web browser information is capable of displaying a font family having a plurality of fonts. The information can include first information specifying the one or more font subsets. The information can also include second information to instruct the computing device how to obtain the one or more fonts displayed at the web page.

In some embodiments, the one or more processors can be further configured to determine whether the one or more fonts specified by the source document form a font family having a plurality of fonts, each of the plurality of fonts having at least one of a different weight and a different style.

In other embodiments, the one or more processors can be further configured to determine the second information when the one or more fonts specified by the source document form the font family having the plurality of fonts.

In some embodiments, the one or more processors can be configured to determine the second information by modifying the source document to obtain a modified source document specifying the plurality of fonts for displaying text at the web page instead of the font family having the plurality of fonts.

In other embodiments, the one or more processors can be configured to modify the source document to obtain the modified source document by rewriting CSS of the source document.

In some embodiments, the one or more processors can be configured to determine the second information by generating a command for the web browser software executing on the computing device.

In other embodiments, the command can cause the web browser software to adjust one or more parameters for displaying a single font subset to automatically synthesize the plurality of fonts using the single font subset.

In some embodiments, the one or more processors can be further configured to determine the single font subset including all of the unique characters of the font family displayed at the web page, and the communication device can be further configured to transmit information indicating the single font subset to the computing device to be used in the synthesis of the plurality of fonts.

In other embodiments, the server can be configured as a proxy server between the computing device and the web server.

In some embodiments, in response to the first request, the source document can be retrieved in whole or in part from a datastore or the source document can be generated in whole or in part.

In other embodiments, the communication device can be further configured to receive a second request from the computing device, the second request being for one or more missing font subsets from the one or more font subsets specified by the first information. The one or more missing font subsets can be font subsets that the computing device does not have.

In some embodiments, the one or more processors can be further configured to embed the one or more missing font subsets or one or more locations of the one or more missing font subsets in the source document to obtain a modified source document, and the communication device can be further configured to transmit the modified source document to the computing device.

In other embodiments, the communication device can be further configured to transmit one or more locations from which to obtain the one or more missing font subsets to the computing device, wherein receiving the one or more locations causes the computing device to retrieve the one or more missing font subsets.

In some embodiments, the one or more processors can be further configured to generate the one or more missing font subsets, and the communication device can be further configured to transmit the one or more missing font subsets to the computing device.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
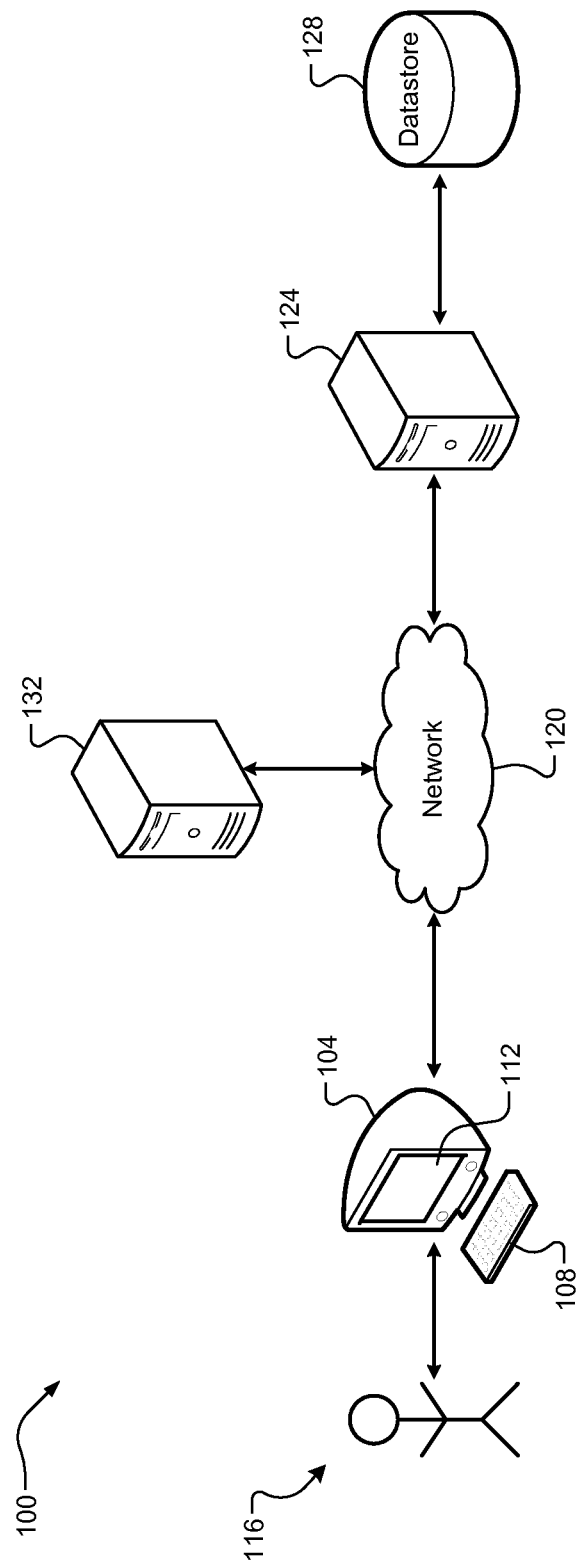
FIG. 1 is a schematic illustration of a system including an example server according to some implementations of the present disclosure.

As previously described, when a computing device does not have a font specified by a source document for a web page, the computing device can locate and download the specified font via a network, e.g., the Internet, or the computing device can use another font in a font stack specified by the source document. Displaying the web page using an alternate font, however, may present the web page in a manner not intended by the web page's creator. In other words, the alternate font may display characters of the text in a different manner than the specified font. Locating and downloading a font can also be time consuming. Further, given the worldwide reach of the Internet, web pages may be presented in many different languages. Some languages, e.g., Japanese and Chinese, include thousands of different characters. The fonts for these languages can be very large and therefore downloading these fonts can be even more time consuming.

Accordingly, techniques are presented for analyzing web pages to determine font subsets. The techniques generally provide for faster loading of web pages at client-side computing devices. A font subset refers to only a portion of a font for displaying text. The font subset includes less than all of the characters of a specified font. A web page may not use every character of a specified font, and therefore only the subset of the specified font may be necessary to display text on the web page. In other words, the font subset may be a smaller set of characters of a specified font for faster loading of the web page. The server can determine the font subset for a web page by identifying which fonts and which individual glyphs are displayed at the web page. A glyph can refer to an element of writing, typically including a character and, in some cases, one or more markings, e.g., a diacritic. For purposes of this disclosure, however, glyphs may be referred to as characters.

A source document representing a web page can specify a font family including a plurality of fonts. A font family can refer to a general font that has different sub-fonts. For example, Arial can represent a font family having Arial (Normal), Arial (Bold), and Arial (Italic) as three of the plurality of fonts in the font family. Arial (Bold) could represent a weighted variation of the Arial font, whereas Arial (Italic) could represent a style variation of the Arial font. The source document can use cascading style sheets (CSS) to specify styling for each of the plurality of fonts in the family. As previously mentioned, the plurality of fonts in the family can include different weight or style variations of the font. For example, the CSS can specify that a portion of text in the source document is to be displayed at the web page in an italic style of the font family, while a remainder of the text in the source document is to be displayed at the web page in a regular style of the font family. This CSS specifying a font family having a plurality of fonts can cause web browser software executing on a computing device to download/retrieve or use more than one font, e.g., one italic font and one regular font. Some web browser software, however, does not support CSS specifying a font family having a plurality of fonts and therefore cannot correctly display the web page as intended by its creator.

The techniques, therefore, can also determine font subsets further based on which web browser (and in some cases, which version of the web browser) is executing on a computing device. The techniques can modify the source document or generate and provide additional instructions to the computing device when the detected web browser software does not support font families having a plurality of fonts. The techniques can include intercepting, at a server including one or more processors, a first request being transmitted from the computing device to a web server via a network. The server can be implemented or configured between the computing device and the web server on the network and can therefore be referred to as a "proxy server." The proxy server can have greater processing capabilities and therefore may be suited to perform the analysis of the web page to determine the font subset. It should be appreciated, however, that the techniques of the present disclosure could be implemented at the web server, another server connected to the network, or some combination of servers connected to the network.

The first request can be for a source document representing a web page. The source document can specify a font for displaying text in the source document. For example, the first request can be generated by web browser software executing on the computing device and can therefore include information indicative of the web browser software, e.g., a particular web browser software and, in some cases, a version. This information can be referred to herein as "web browser information." The techniques can include intercepting, at the server, the source document being transmitted from the web server to the computing device via the network. Interception can refer to actual interception and subsequent forwarding of the first request and the source document after processing. Alternatively, as previously mentioned, interception can refer to communications between the computing device and the web server being configured to be routed through the server.

The techniques can include generating, at the server, the web page using the source document. For example, the server can generate the web page by rendering the web page using the source document, which then may be stored in memory. The techniques can include determining, at the server, one or more font subsets by analyzing the web page. For example, the techniques can determine one or more fonts displayed at the web page and one or more individual characters displayed at the web page for each of the one or more fonts. The techniques can determine, at the server, the one or more font subsets further based on the web browser information. If the web browser information indicates that the web browser software executing on the computing device incapable of displaying a font family having a plurality of fonts, the techniques can perform one of a plurality of actions. For example, the web browser software may be an older version that is incapable of processing a font family specified by the source document, therefore causing the web browser software to be incapable of displaying the font family.

The plurality of actions can include modifying the source document to obtain a modified source document. The modified source document can specify a plurality of fonts instead of a font family and a plurality of styles. For example, the modification can include rewriting the CSS in the source document to obtain the modified source document. The plurality of actions can also include generating and transmitting a command to the computing device, to cause the web browser software executing on the computing device to adjust one or more parameters for displaying a single font subset to obtain the plurality of fonts using the single font subset. For example, adjusting the one or more parameters can include programmatically distorting outlines of a regular weighted/styled font to automatically synthesize different weight/style variations of the font in order to obtain the plurality of fonts. For example only, the command could cause the web browser software to programmatically distort the outlines of Arial (Normal) to automatically synthesize Arial (Italic).

If the web browser information indicates that the web browser software executing on the computing device can display the font family having the plurality of fonts, the techniques can include transmitting, from the server, information specifying the one or more font subsets to the computing device. When the computing device is in possession of the specified one or more font subsets, e.g., in memory, the computing device can display the web page. When the computing device does not have one or more of the specific font subsets, the computing device can transmit a second request to the server. In response to this request, the server can transmit either a location to get the one or more missing font subsets, e.g., a hyperlink, to the computing device or the server can generate the one or more missing font subsets and transmit the one or more missing font subsets to the computing device. The server could also transmit the one or more missing font subsets itself or their location(s) by embedding data in the source document to obtain a modified source document that is different than the modified source document having the rewritten CSS.

As previously mentioned, the font subset may generally include less than all of the characters of a specified font. The font subset, however, can also be over-inclusive. In other words, the font subset can include more than the characters required by the web page (the unique characters). The techniques can provide a font subset that includes the unique characters and additional characters. The additional characters can be those characters commonly used in the language of the web page, and/or characters related to or based on the unique characters. For example only, the font subset may include uppercase characters when only lowercase characters are required by the web page. Additionally or alternatively, for example, the techniques can provide a font subset including all accented characters in addition to required non-accented characters (different glyphs). Further, a font subset may be lacking one or more of the characters displayed by the web page. For example, the techniques may be unable to identify or locate a particular character of the specified font, and therefore the techniques may not include that particular character in the font subset.

Referring now to FIG. 1, an example system 100 is illustrated. The system 100 can include a computing device 104, such as a desktop computer, a laptop computer, a tablet computer, or a mobile phone. The computing device 104 can be associated with a user 116.

The computing device 104 can include a user interface 108 and a display 112. The computing device 104 can also include other components, such as one or more processors and memory. While the display 112 is shown and described as a separate component, the display 112 can also be part of the user interface 108. The user interface 108 can include one or more components for interaction between the computing device 104 and the user 116 (keyboard, mouse, etc.). The computing device 104 can also communicate with other components via a network 120. The network 120 can include a local area network (LAN), a wide area network (WAN), e.g., the Internet, or a combination thereof.

A web server 124 can communicate with the computing device 104 via the network 120. The web server 124 can include one or more processors and memory. It should be appreciated that while a single web server is shown, two or more web servers can be implemented, e.g., in a parallel or distributed server configuration. The web server 124 can provide a source document to the computing device 104 in response to a request. As previously described, the source document can be interpreted by a web browser executing on the computing device 104 to display a web page at the display 112. The web server 124 can store a plurality of source documents representing a plurality of web pages, respectively.

The source documents can be stored at the web server 124 and/or in a datastore 128. The datastore 128 can be located in the web server 124 or external to the web server 124, e.g., on the network 120. The datastore 128 can also store predetermined portions of source documents. These predetermined portions of source documents can also be referred to as templates. More specifically, the web server 124 may generate a source document in order to display a web page having a predetermined layout according to one of the templates. In this manner, the web server 124 can selectively retrieve one or more predetermined portions when generating a source document.

The system 100 can also include another server 132 configured for communication via the network 120. As shown, the server 132 can be an "intermediate server" between the computing device 104 and the web server 124. For example, the server 132 may be a proxy server. The server 132 can be configured to intercept the request being transmitted from the computing device 104 to the web server 124 and/or the source document being transmitted from the web server 124 to the computing device 104 in response to the request. For example, the server 132 can have a unique Internet protocol (IP) address, and the computing device 104 and/or the web server 124 can be configured to route communications through the server 132.

Intercepting the source document can refer to actually intercepting (and subsequent re-transmission of) the source document being transmitted from the web server 124 to the computing device 104. Intercepting the source document can also refer to other techniques implemented by proxy servers. It should be appreciated that while intercepting the request and/or the source document are described, the server 132 can be configured to receive the request and/or the source document in accordance with its configuration as a proxy server between the computing device 104 and the web server 124.

The server 132 can render the source document to generate the web page. The server 132 can then analyze the web page to determine one or more font subsets for the web page (described later in detail). The server 132 can then transmit information specifying the font subset(s) to the computing device 104.

Figure 2:
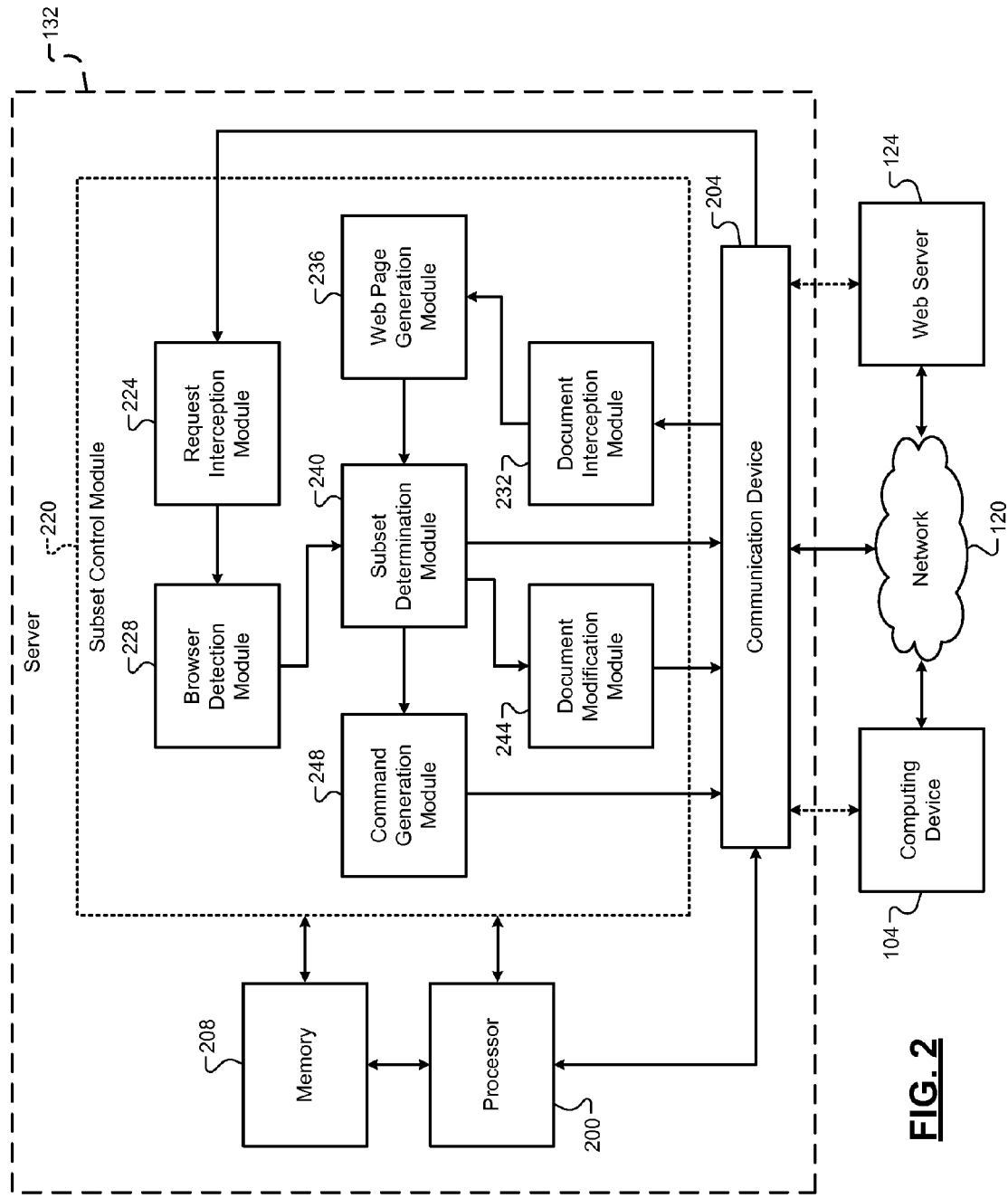
FIG. 2 is a functional block diagram of the example server of FIG. 1.

Referring now to FIG. 2, a functional block diagram of the server 132 is illustrated. The server 132 can include a processor 200, a communication device 204, and a subset control module 220. It should be appreciated that while one processor 200 is shown, the server 132 can include two or more processors operating in a parallel or distributed architecture. Therefore, the term "processor" as used herein can refer to one or more processors. The communication device 204 can include one or more components, e.g., a transceiver, suitable for enabling the server 132 to communicate with the computing device 104 and the web server 124 via the network 120. The server 132 can also include other components, such as memory 208. The subset control module 220 can include a request interception module 224, a browser detection module 228, a document interception module 232, a web page generation module 236, a subset determination module 240, a document modification module 244, and a command generation module 248. These modules can be executed entirely or partially by the one or more processors, e.g., processor 200, of the server 132.

The request interception module 224 can intercept a first request being transmitted from the computing device 104 to the web server 124 via the network 120. For example, the request interception module 224 can command the communication device 204 to intercept the first request, which can then send the first request to the request interception module 224. The first request can be for a web page. The first request, therefore, can also be for a source document associated with the web page. The first request can be generated by the web browser software executing on the computing device 104 in response to input from the user 116. For example only, the input from the user 116 can be either a universal resource locator (URL) address or selection of a hyperlink. The first request can also include information indicating which web browser software is executing on the computing device 104. For example, the first request could be a hypertext transfer protocol (HTTP) request and the information could be included in a User-Agent string of the HTTP request.

The browser detection module 228 can receive the first request from the request interception module 224. The browser detection module 228 can determine the web browser information by parsing the first request and extracting the web browser information. As previously mentioned, the web browser information can indicate specific web browser software, e.g., Browser X, executing on the computing device 104 and, in some cases, a version of the particular web browser software, e.g., version 2.0. For example, if the first request is an HTTP request, the browser detection module 228 can parse the User-Agent string of the HTTP request in order to determine the web browser information.

As previously described, if the server 132 actually intercepts the first request, the server 132 can subsequently re-transmit the first request to the web server 124 via the network 120 after processing the first request. In response to receiving the first request, the web server 124 can obtain the source document. The source document may have been previously stored in whole or in part in the web server 124, e.g., cached in memory, or in the datastore 128. For example, the source document may have been previously generated in whole or in part, or retrieved in whole or in part from another server. The source document, however, may not have been previously stored at the web server 124 or in the datastore 128. Additionally, some web pages may be dynamically generated for each user. For example, these web pages could include advertisements that are different each time the web pages are loaded.

When the source document is not present at the web server 124, the web server 124 can generate the source document in whole or in part, e.g., dynamically generated for each user. For example only, the web page may be an electronic mail (e-mail) account that is dynamically generated for each user to display their personal contacts in addition to advertisements based on their preferences or interests. The web page, therefore, may include one or more predetermined or pre-defined portions. These predetermined portions can be used as templates in generating the source document. The predetermined portions can be stored in the web server 124 or in the datastore 128. After retrieving or generating the source document in whole or in part, the web server 124 can transmit the source document to the computing device 104 via the network 120.

The document interception module 232 can intercept a source document being transmitted from the web server 124 to the computing device 104 via the network 120 in response to the first request. For example, document interception module 232 can command the communication device 204 to intercept the source document, which can then send the source document to the document interception module 232. The source document can represent the requested web page. The web page generation module 236 can receive the source document from the document interception module 232 and generate the web page using the source document. For example, the web page generation module 236 can render the web page and store the rendered web page in the memory 208. It should be appreciated that other web page generation or rendering techniques can also be implemented.

The subset determination module 240 can receive the web page from the web page generation module 236. Alternatively, the subset determination module 240 could retrieve the web page from the memory 208 after generation by the web page generation module 236. The subset determination module 240 can analyze the web page to determine one or more font subsets. Specifically, the subset determination module 240 can identify one or more fonts used to display text at the web page as well as identify unique characters for each of the one or more fonts. In some cases, the subset determination module 240 can identify a font family used to display text at the web page, where the font family includes a plurality of fonts having different weights and/or styles. It should be appreciated that the subset determination module 240 could also identify the font family by parsing the source document for related CSS.

As previously mentioned, the subset determination module 240 can determine the one or more font subsets further based on the web browser information from the browser detection module 228. More specifically, if the web browser information indicates that the web browser software executing on the computing device 104 is incapable of displaying a font family having a plurality of fonts, the subset determination module 240 can perform one of a plurality of actions. A programmer of the server 132 or a developer/creator of the web page can select which of the plurality of actions is to be used. Information transmitted as a result of each the plurality of actions can generally be referred to as second information. The plurality of actions can include enabling or commanding the document modification module 244 to modify the source document to obtain a modified source document. The modified source document can specify a plurality of fonts instead of the font family having the plurality of fonts with varying weights and/or styles. For example, the modification can include rewriting the CSS in the source document to obtain the modified source document.

The plurality of actions can also include enabling or commanding the command generation module 248 to generate a command for the computing device 104. In addition, the subset determination module 240 can determine a single font subset including all of the unique characters of the font family displayed at the web page, and can provide information specifying the single font subset to the command generation module 248. The command generation module 248 can transmit the command and the information specifying the single font subset to the computing device 104. The command can cause the web browser software executing on the computing device 104 to adjust one or more parameters for displaying the single font subset to obtain the plurality of fonts using the single font subset. For example, adjusting the one or more parameters for displaying the single font subset can include programmatically distorting outlines of a regular weighted/styled font to automatically synthesize different weight/style variations of the font in order to obtain the plurality of fonts. For example only, the command could cause the web browser software to programmatically distort the outlines of Arial (Normal) to automatically synthesize Arial (Italic).

If the web browser information indicates that the web browser software executing on the computing device 104 is capable of displaying the font family having the plurality of fonts, then the subset determination module 240 can determine the one or more font subsets. For example only, the source document may only specify one font and therefore the subset determination module 240 can determine the subset for the font. The subset determination module 240 can also generate information specifying the one or more font subsets, which can be referred to generally as first information. For example only, the first information can be a unique identifier or code that specifies the subset of the font. The subset determination module 240 can send the first information specifying the one or more font subsets to the communication device 204, which can transmit the first information specifying the one or more font subsets to the computing device 104 via the network 120. Additionally or alternatively, the source document can have embedded script or template language, e.g., processing tags such as active server pages (ASP), GXP, JavaServer Pages (JSP), and/or PHP tags, which can be used by the subset determination module 240 in determining the one or more font subsets.

When the source document and the first information specifying the one or more font subsets are received, the computing device 104 can attempt to display the web page using the web browser software executing on the computing device 104. More specifically, the computing device 104 can determine whether the computing device 104 has the one or more font subsets specified by the information, e.g., in memory. When the computing device 104 does not have one or more of the font subsets, the web page may not load as desired. For example, the web page could be loaded using another font in the font stack, the web page could be displayed with some unreadable characters, or the web page could be displayed in a manner not intended by its creator. In this case, the computing device 104 can generate a second request. The second request can be for the one or more missing font subsets. The second request may be generated in response to CSS received, e.g., in the source document, from the web server 124 via the network 120, which is described in detail below.

In response to receiving the second request from the computing device 104 via the network 120, the server 132 can determine a location to get the one or more missing font subsets, e.g., on the network 120. For example only, the location may be indicated by URL address or a hyperlink. For example, the communication device 204 can receive the second request. The server 132 may know one or more locations to get the one or more missing font subsets. For example, the one or more locations can be stored in the memory 208. In some implementations, the server 132 could include the location to get each of the one or more font subsets when initially providing the source document and the information specifying the one or more font subsets. The server 132 could embed the location in the source document as a hyperlink to the location, e.g., http://server/font1/subset1.

The server 132 may not know the location to obtain the one or more missing font subsets. In this case, the server 132 could search for the one or more missing subsets via the network 120. This search could be performed using the communication device 204 to access the network 120. For example, the server 132 could generate a search query for the one or more missing font subsets. As a result of the searching, the server 132 may determine the location to get the one or more missing font subsets. After determining the location to get the one or more missing font subsets, the server 132 can provide the location to the computing device 104 via the network 120. Alternatively, in the case that the server 132 does not know the location to obtain the subset of the font, the server 132 can provide CSS to the computing device 104 via the network 120 in order to enable the computing device 104 to request the one or more missing font subsets. For example, the CSS could be added to the source document.

In some cases, the server 132 may not know the location to obtain the one or more missing font subsets and, if performed, the searching may fail to determine the location to obtain the one or more missing font subsets. In these cases, the server 132 can generate the one or more missing font subsets. For example, the server 132 can generate the one or more missing font subsets by compiling each of the unique characters of each font displayed at the web page into one or more common files. For example only, each of the unique characters in the specified font can be a separate image file. Each subset of a font could be expressed as a list. For example only, the subset of the font could be "abcd" for a Latin or Roman alphabet-based, e.g., English, font.

After generating the one or more missing font subsets, the server 132 can then provide the one or more missing font subsets to the computing device 104 via the network 120. The server 132 can download or stream the one or more missing font subsets to the computing device 104. For example only, the server 132 can provide the one or more missing font subsets by providing the list as a URL parameter (e.g., http://server/font?text=abcd) by encoding the list as a file name (e.g., http://server/font-name/abcd), or by sending the list as a separate file type in CSS provided to the computing device 104 (described above). It should be appreciated that other techniques can be used. For example, the server 132 could also embed the one or more missing font subsets directly into the source document. Alternatively, for example, the server 132 can send the one or more missing font subsets to the communication device 204, which can transmit the one or more missing font subsets to the computing device 104 via the network 120.

When the computing device 104 receives the location to get the one or more missing font subsets from the server 132, the computing device 104 can retrieve, e.g., download, the one or more missing font subsets from the one or more locations. The computing device 104 can then display the web page in the web browser executing on the computing device 104 using all of the received/retrieved font subsets. The computing device 104 can also store some or all of the received/retrieved font subsets, e.g., in memory, in order to expedite displaying of web pages in the future.

Figure 3:
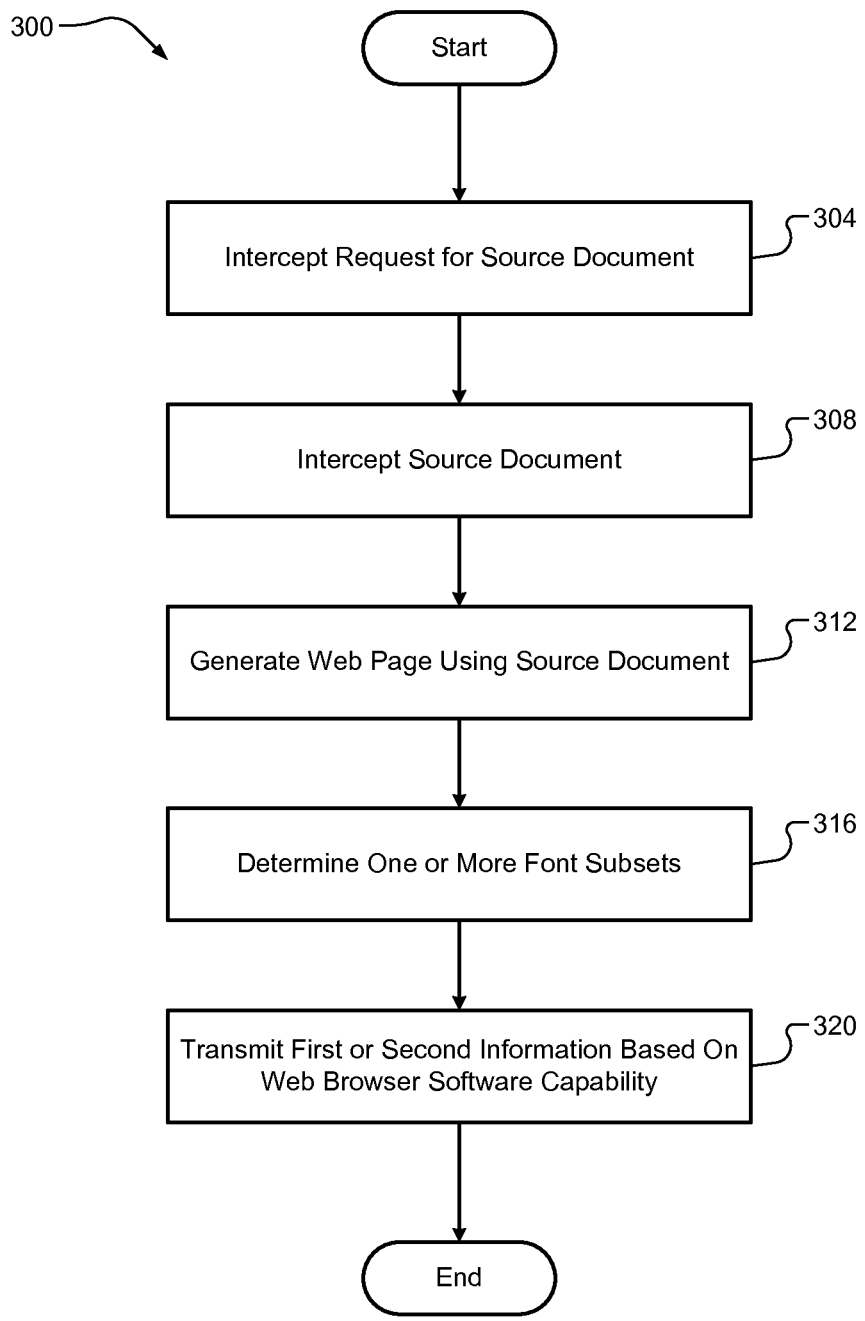
FIG. 3 is a flow diagram of an example technique for analyzing web pages to determine font subsets according to some implementations of the present disclosure.

Referring now to FIG. 3, an example technique 300 for analyzing web pages to determine font subsets is illustrated. At 304, the server 132 can intercept a first request for a source document representing a web page. The first request can be in the process of being transmitted from the computing device 104 to the web server 124 via the network 120. The first request can include web browser information indicating web browser software executing on the computing device 104. At 308, the server 132 can intercept the source document being transmitted from the web server 124 to the computing device 104 via the network 120 in response to the first request. The source document can specify one or more fonts in which to display text in the source document.

At 312, the server 132 can generate the web page using the source document. The web page can include the text displayed in the one or more specified fonts. At 316, the server 132 can determine unique characters displayed at the web page for each of the one or more fonts displayed at the web page to obtain one or more font subsets. At 320, the server 132 can transmit information to the computing device 104 based on whether the web browser software indicated by the web browser information is capable of displaying a font family having a plurality of fonts. The information can include (i) first information specifying the one or more font subsets, or (ii) second information to instruct the computing device 104 how to obtain the one or more fonts displayed at the web page.

The technique 300 can then end or return to 304 for one or more additional cycles.

Figure 4:
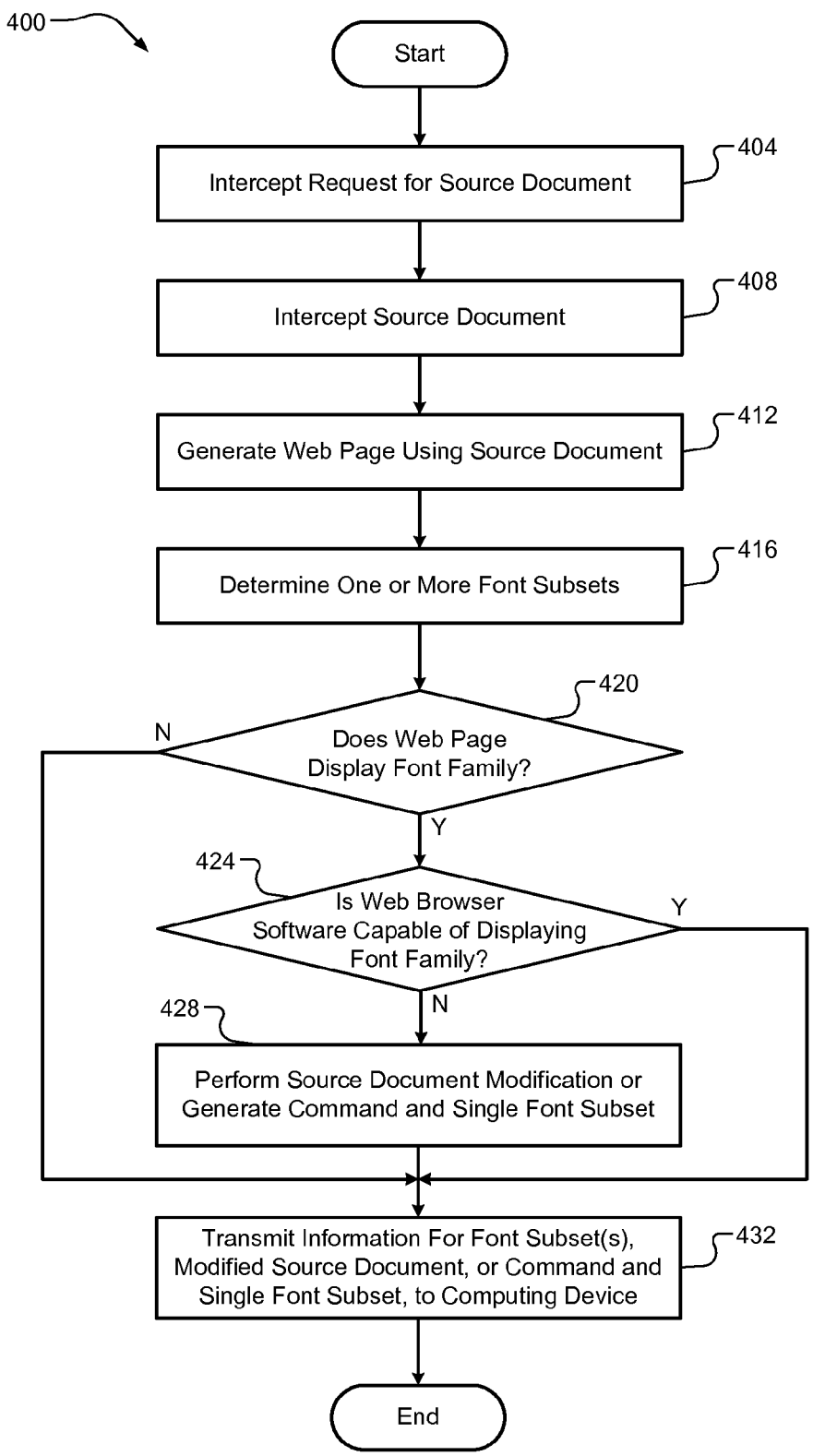
FIG. 4 is a flow diagram of another example technique for analyzing web pages to determine font subsets according to some implementations of the present disclosure.

Referring now to FIG. 4, another example technique 400 for analyzing web pages to determine font subsets is illustrated. At 404, the server 132 can intercept a request for a source document representing a web page. The request can be in the process of being transmitted from the computing device 104 to the web server 124 via the network 120. The request can include web browser information indicating web browser software executing on the computing device 104. At 408, the server 132 can intercept the source document being transmitted from the web server 124 to the computing device 104 via the network 120 in response to the request. The source document can specify one or more fonts in which to display text in the source document. At 412, the server 132 can generate the web page using the source document. The web page can include the text displayed in the one or more specified fonts.

At 416, the server 132 can determine unique characters displayed at the web page for each of the one or more fonts displayed at the web page to obtain one or more font subsets. At 420, the server 132 can determine whether the one or more fonts displayed at the web page form a font family having a plurality of fonts, with each of the plurality of fonts having at least one of a different weight and a different style. At 424, the server 132 can determine whether the web browser software indicated by the web browser information is capable of displaying the font family having the plurality of fonts. If the web browser software indicated by the web browser information is capable of displaying the font family having the plurality of fonts, the technique 400 can proceed to 432. If the web browser software indicated by the web browser information is incapable of displaying the font family having the plurality of fonts, the technique 400 can proceed to 428.

At 428, the server 132 can perform one of a plurality of actions including (i) modifying the source document to obtain a modified source document, or (ii) generating a command for the web browser software executing on the computing device and a single font subset including all of the unique characters of the font family displayed at the web page. The modified source document can specify the plurality of fonts for displaying text at the web page instead of the font family having the plurality of fonts. The command can cause the web browser software to adjust one or more parameters to automatically synthesize the plurality of fonts using the single font subset. At 432, the server 132 can transmit to the computing device 104 information specifying the one or more font subsets (when the web browser indicated by the web browser information is capable of displaying the font family having the plurality of fonts), the modified source document, or the command and the single font subset.

The technique 400 can then end or return to 404 for one or more additional cycles.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:

intercepting, at a proxy server including one or more processors, a request for a source document representing a web page, the request being transmitted from a remote computing device to a remote web server via a network, the request including web browser information indicating web browser software executing on the remote computing device;

intercepting, at the proxy server, the source document being transmitted from the remote web server to the remote computing device via the network in response to the request, the source document including a text and specifying one or more fonts in which to display the text;

rendering, at the proxy server, the web page using the source document, the web page including the text displayed in the one or more fonts;

determining, at the proxy server, unique characters displayed at the web page for each of the specified one or more fonts in which the text is displayed;

obtaining, at the proxy server, one or more font subsets based on the unique characters, wherein at least one of the one or more font subsets includes the unique characters in the source document and one or more additional characters related to the unique characters in the source document, and wherein the one or more additional characters related to the unique characters include at least one of (i) one or more characters having a different case than one or more of the unique characters and (ii) one or more characters having a different accent than one or more of the unique characters;

determining, at the proxy server, whether the one or more fonts in which the text is displayed form a font family having a plurality of fonts, each of the plurality of fonts having at least one of a different weight and a different style;

determining, at the proxy server, whether the web browser software indicated by the web browser information is capable of displaying the font family having the plurality of fonts; and modifying, at the proxy server, the source document by embedding the plurality of fonts therein to obtain a modified source document when the one or more fonts displayed at the web page form the font family having the plurality of fonts and the web browser software indicated by the web browser information is incapable of displaying the font family having the plurality of fonts; and transmitting, from the proxy server to the remote computing device, information specifying the one or more font subsets when the web browser software indicated by the web browser information is capable of displaying the font family having the plurality of fonts, the modified source document, or a command and a single font subset.

2. The computer-implemented method of claim 1, wherein the plurality of fonts of the font family include at least two of (i) a normal version of a specific font, (ii) a bolded version of the specific font, (iii) an italicized version of the specific font, and (iv) an underlined version of the specific font.

3. The computer-implemented method of claim 1, further comprising in response to being unable to locate or identify one or more particular characters, obtaining the one or more font subsets having less than all of the unique characters in the source document.

4. A computer-implemented method comprising:
intercepting, at a server including one or more processors, a first request for a source document representing a web page, the first request being transmitted from a computing device to a web server via a network, the first request including web browser information indicating web browser software executing on the computing device;

intercepting, at the server, the source document being transmitted from the web server to the computing device via the network in response to the first request, the source document specifying one or more fonts in which to display a text in the source document;

rendering, at the server, the web page using the source document, the web page including the text displayed in the one or more fonts;

determining, at the server, unique characters displayed at the web page for each of the one or more fonts in which the text is displayed;

obtaining, at the server, one or more font subsets based on the unique characters, wherein at least one of the one or more font subsets includes the unique characters in the source document and one or more additional characters related to the unique characters in the source document, and wherein the one or more additional characters related to the unique characters include at least one of (i) one or more characters having a different case than one or more of the unique characters and (ii) one or more characters having a different accent than one or more of the unique characters; and transmitting, from the server, information to the computing device based on whether the web browser software indicated by the web browser information is capable of displaying a font family having a plurality of fonts, the information specifying the one or more font subsets;

receiving, at the server, a second request from the computing device, the second request being for one or more missing font subsets from the one or more font subsets specified by the information, the one or more missing font subsets being font subsets that the computing device does not have;

embedding, at the server, the one or more missing font subsets in the source document to obtain a modified source document; and transmitting, from the server, the modified source document to the computing device.

5. The computer-implemented method of claim 4, further comprising determining whether the one or more fonts specified by the source document form a font family having a plurality of fonts, each of the plurality of fonts having at least one of a different weight and a different style.

6. The computer-implemented method of claim 5, further comprising determining the information when the one or more fonts specified by the source document form the font family having the plurality of fonts.

7. The computer-implemented method of claim 6, wherein determining the information includes modifying the source document to obtain a modified source document specifying the plurality of fonts for displaying text at the web page instead of the font family having the plurality of fonts.

8. The computer-implemented method of claim 7, wherein modifying the source document to obtain the modified source document includes rewriting cascading style sheets (CSS) of the source document.

9. The computer-implemented method of claim 6, wherein determining the second information includes generating a command for the web browser software executing on the computing device.

10. The computer-implemented method of claim 9, wherein the command causes the web browser software to adjust one or more parameters for displaying a single font subset to automatically synthesize the plurality of fonts using the single font subset.

11. The computer-implemented method of claim 10, further comprising determining the single font subset including all of the unique characters of the font family displayed at the web page and transmitting information indicating the single font subset to the computing device to be used in the synthesis of the plurality of fonts.

12. The computer-implemented method of claim 5, wherein the plurality of fonts of the font family include at least two of (i) a normal version of a specific font, (ii) a bolded version of the specific font, (iii) an italicized version of the specific font, and (iv) an underlined version of the specific font.

13. The computer-implemented method of claim 4, wherein the source document is retrieved in whole or in part from a datastore in response to the first request.

14. The computer-implemented method of claim 4, wherein the source document is generated in whole or in part in response to the first request.

15. The computer-implemented method of claim 4, further comprising:
transmitting, from the server, one or more locations from which to obtain the one or more missing font subsets to the computing device, wherein receiving the one or more locations causes the computing device to retrieve the one or more missing font subsets.

16. The computer-implemented method of claim 4, further comprising:
generating, at the server, the one or more missing font subsets; and transmitting, from the server, the one or more missing font subsets to the computing device.

17. The computer-implemented method of claim 4, further comprising in response to being unable to locate or identify one or more particular characters, obtaining the one or more font subsets having less than all of the unique characters in the source document.

18. A server, comprising:
a communication device configured to:
intercept a first request for a source document representing a web page, the first request being transmitted from a computing device to a web server via a network, the first request including web browser information indicating web browser software executing on the computing device, and
intercept the source document being transmitted from the web server to the computing device via the network in response to the first request, the source document specifying one or more fonts in which to display a text in the source document; and
one or more processors configured to:
render the web page using the source document, the web page including the text displayed in the one or more fonts,
determine unique characters displayed at the web page for each of the one or more fonts in which the text is displayed, and
obtain one or more font subsets based on the unique characters, wherein at least one of the one or more font subsets includes the unique characters in the source document and one or more additional characters related to the unique characters in the source document, and wherein the one or more additional characters related to the unique characters include at least one of (i) one or more characters having a different case than one or more of the unique characters and (ii) one or more characters having a different accent than one or more of the unique characters
wherein the communication device is further configured to:
transmit information to the computing device based on whether the web browser software indicated by the web browser information is capable of displaying a font family having a plurality of fonts, the information specifying the one or more font subsets, and
receive a second request from the computing device, the second request being for one or more missing font subsets from the one or more font subsets specified by the information, the one or more missing font subsets being font subsets that the computing device does not have,
wherein the one or more processors are further configured to embed the one or more missing font subsets in the source document to obtain a modified source document, and
wherein the communication device is further configured to transmit the modified source document to the computing device.

19. The server of claim 18, wherein the one or more processors are further configured to determine whether the one or more fonts specified by the source document form a font family having a plurality of fonts, each of the plurality of fonts having at least one of a different weight and a different style.

20. The server of claim 19, wherein the one or more processors are further configured to determine the information when the one or more fonts specified by the source document form the font family having the plurality of fonts.

21. The server of claim 20, wherein the one or more processors are configured to determine the information by modifying the source document to obtain a modified source document specifying the plurality of fonts for displaying text at the web page instead of the font family having the plurality of fonts.

22. The server of claim 21, wherein the one or more processors are configured to modify the source document to obtain the modified source document by rewriting cascading style sheets (CSS) of the source document.

23. The server of claim 20, wherein the one or more processors are configured to determine the second information by generating a command for the web browser software executing on the computing device.

24. The server of claim 23, wherein the command causes the web browser software to adjust one or more parameters for displaying a single font subset to automatically synthesize the plurality of fonts using the single font subset.

25. The server of claim 24, wherein the one or more processors are further configured to determine the single font subset including all of the unique characters of the font family displayed at the web page, and wherein the communication device is further configured to transmit information indicating the single font subset to the computing device to be used in the synthesis of the plurality of fonts.

26. The server of claim 19, wherein the plurality of fonts of the font family include at least two of (i) a normal version of a specific font, (ii) a bolded version of the specific font, (iii) an italicized version of the specific font, and (iv) an underlined version of the specific font.

27. The server of claim 18, wherein in response to the first request, the source document is retrieved in whole or in part from a datastore or the source document is generated in whole or in part.

28. The server of claim 18, wherein the communication device is further configured to transmit one or more locations from which to obtain the one or more missing font subsets to the computing device, wherein receiving the one or more locations causes the computing device to retrieve the one or more missing font subsets.

29. The server of claim 18, wherein the one or more processors are further configured to generate the one or more missing font subsets, and wherein the communication device is further configured to transmit the one or more missing font subsets to the computing device.

30. The server of claim 18, wherein the one or more processors are further configured to in response to being unable to locate or identify one or more particular characters, obtain the one or more font subsets having less than all of the unique characters in the source document.

* * * * *